March 25, 1952 — W. A. DOERING — 2,590,237
JUICE EXTRACTOR
Filed Dec. 19, 1949 — 2 SHEETS—SHEET 1
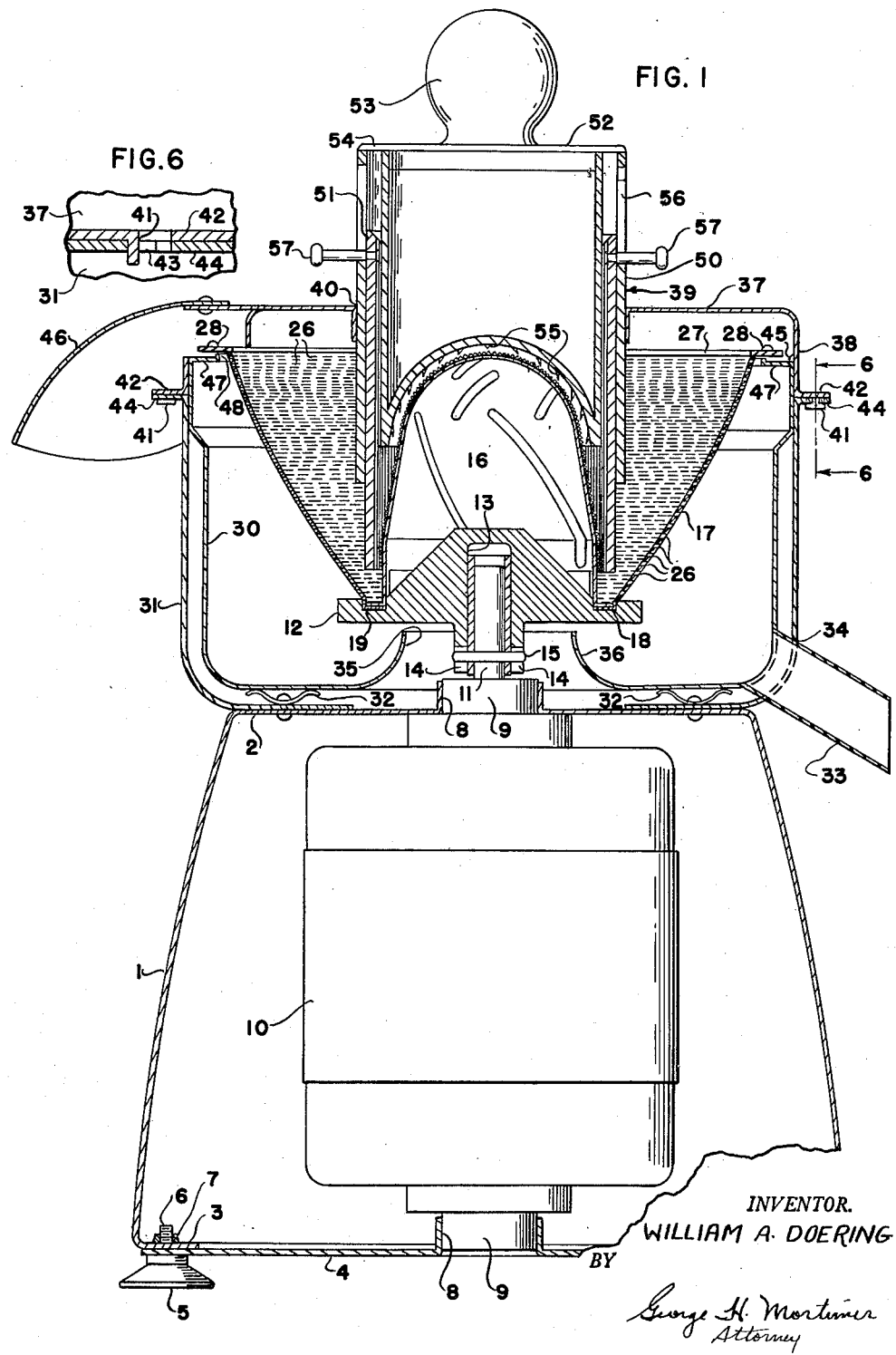
INVENTOR.
WILLIAM A. DOERING
BY George H. Mortimer
Attorney

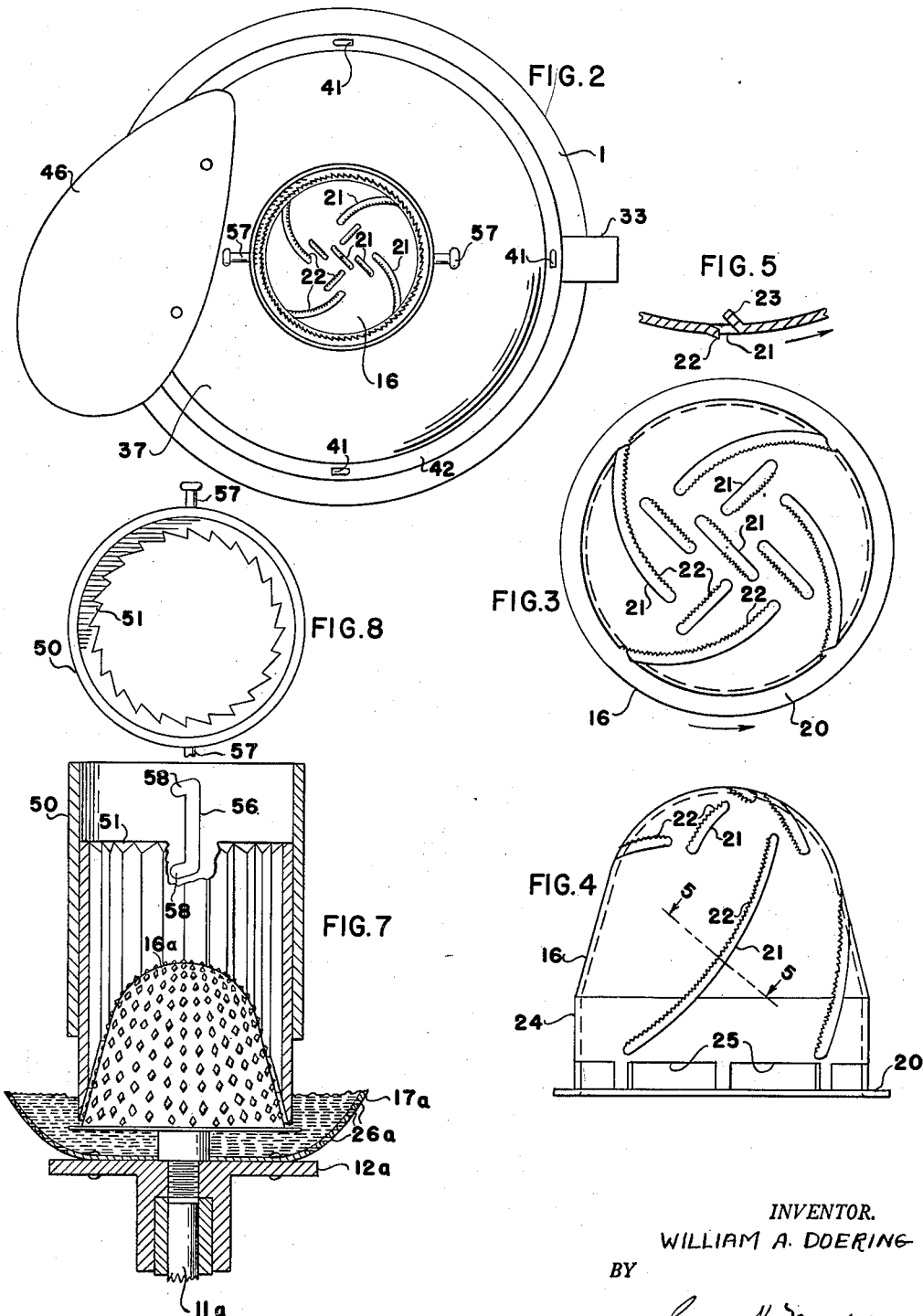

Patented Mar. 25, 1952

2,590,237

UNITED STATES PATENT OFFICE 2,590,237

JUICE EXTRACTOR

William A. Doering, Palo Alto, Calif.

Application December 19, 1949, Serial No. 133,704

19 Claims. (Cl. 146—3)

The present invention relates to a juice extractor, and more particularly to an extractor which is adapted to extract juice from all types of fruits and vegetables, including citrus fruits and leafy vegetables.

The nutritive value of juices extracted from fruits and vegetables is well known. The difficulty of extracting them by hand led to the development of power extractors of which there are two general types available on the market. One of these types is adapted to juice citrus fruits but cannot be used for juicing other fruits or vegetables. The other type is capable of disintegrating non-citrus fruits, root vegetables such as beets, carrots, etc., and to some extent leafy vegetables such as spinach, lettuce, kale, cabbage, etc. There have been some proposals to construct a single machine capable of performing both types of operations but no such proposal has been sufficiently practicable to find commercial acceptance despite a recognized need for such a juice extractor.

The present invention satisfies this long-felt need in a simple and practicable manner and provides a juice extractor of simple construction which is safe to use, easy to clean and which can be quickly adjusted to operate on any kind of fruit or vegetable. The principle of the invention and the best mode of applying it now known will be set forth in the following detailed description, taken in conjunction with the drawings, in which:

Fig. 1 is a vertical sectional view of a preferred embodiment of the invention;

Fig. 2 is a plan view of the device of Fig. 1;

Figs. 3 and 4 are plan and elevation, respectively, of a preferred reamer;

Fig. 5 is a section on the line 5—5 of Fig. 4 on a somewhat larger scale;

Fig. 6 is a section on the line 6—6 of Fig. 1; and

Figs. 7 and 8 show a modified embodiment of chute and reamer construction in plan and vertical section, respectively.

Referring now to Figs. 1 and 2, the juice extractor comprises a motor housing 1, preferably of circular cross section, having a top wall 2, a bottom flange 3 and a bottom plate 4 secured to said flange by a plurality of rubber feet 5 having threaded metallic shanks 6 engaging nuts 7 on flange 3. The top wall 2 and bottom plate 4 have aligned flanged openings 8 forming tight friction fit with end bells 9 of a motor 10 which is adapted to be secured by conventional cord and plug to a power source, preferably through a switch. Since these parts are purely conventional, they are not illustrated since they do not form part of the invention. The shaft 11 of the motor 10 extends above the motor housing a sufficient distance to give adequate support to a mounting plate 12, preferably of cylindrical shape, which has a bore 13 to receive the shaft and a bifurcated flange surrounding the bore to provide slots 14 for a pin 15 through the shaft 11. This construction makes it possible to detach the mounting plate easily and quickly from the shaft by simply lifting it therefrom but also assures positive drive of the plate. While the direction of rotation is not material, the apparatus shown in the drawing is designed for counterclockwise rotation as viewed in Fig. 2.

Mounted on plate 12 are a reamer 16 and a strainer 17. A convenient way of fastening these parts securely together is to provide a circular groove in plate 12, as shown at 18, to form an inwardly directed flange 19 on the strainer, and an outwardly directed flange 20 on the reamer which fit into the groove where they are held by rivets, spot welding or the like.

The reamer 16, as seen best in Figs. 3 and 4, is a hollow conoid having a plurality of slots 21 along the trailing edges of which teeth 22 project outwardly. A wing 23 on the leading edge of the slots prevents centrifugal force from throwing particles formed by the teeth, which pass through the slot into the interior, back out. While a variety of slot arrangements can be used, that shown in the drawing has been found satisfactory in practice. As may be seen, there is a slot crossing the apex or tip and extending beyond the upper ends of four additional slots on the somewhat hemispherical dome of the reamer. These latter also extend beyond the upper ends of four additional slots which run from the dome down the conical walls and into a cylindrical portion 24. The rows of teeth along the trailing edges of these last mentioned slots slope rearwardly from top to bottom of the reamer, i. e., in rotating past a fixed plane through the axis of rotation the top of the row of teeth passes through the plane first. The angle of slope may vary but it is advantageous to arrange the teeth in this way because it tends to move material contacting the teeth but not rotating therewith in a downward direction. In the lower part of the cylindrical portion 24 are several outlet passages 25 through which particles entering the reamer through slots 21 are discharged by centrifugal force into the strainer.

The strainer 17 is circular in cross section and its wall diverges upwardly so that centrifugal force imparts an upward component to material in it as well as an outward component. The wall is provided with many apertures or perforations 26 of a size which permits juice to pass readily but which retains pulp. At the upper rim of strainer 17 is an outwardly directed flange 27 which may either be integral with the strainer or a separate annulus to which the strainer is secured by any suitable means such as rivets, welding, brazing, etc. The flange carries a plurality of small projections 28 for a purpose later to be described.

Surrounding the strainer 17 is a bowl 30 for receiving juices. While it may be secured to the motor housing 1 in any desired manner, it is preferred to rivet or otherwise fasten a bowl housing 31 to the motor housing and to provide resilient supports 32 in the bottom thereof upon which the bowl rests. Both the bowl 30 and its housing 31 are preferably circular in cross section and at the top they should telescope together so that there is practically no radial play. Below the top, space must be provided so that the bowl can be tilted sufficiently to pull a spout 33 at the bottom of the bowl at one side thereof out of a spout opening 34 in the bowl housing 31. The bowl has a central aperture 35 large enough to clear the motor shaft 11 and an upturned flange 36 surrounding opening 35 prevents juice from running out of the same during operation.

An annular cover 37 having a cylindrical flange 38, preferably of the same diameter as the bowl housing 31, closes the bowl 30 except at the center where a feed chute designated generally by reference number 39 is mounted in an opening 40 in the cover. Means are provided for removably fastening the cover to the bowl housing. A convenient and inexpensive fastening means comprises a plurality of lugs 41 of inverted T-shape struck out of an outwardly directed flange 42 on the lower rim of the cover 37 which cooperate with bayonet slots 43 in a similar flange 44 on the upper rim of bowl housing 31, as seen in Figs. 1 and 6. The slots preferably are arranged so that the turning moment imparted to the cover by rotation of the reamer tends to keep it latched to the bowl housing. About midway around the cylindrical portion 38 of the cover are several small projection 45 which are adapted to contact the upper rim of bowl 30 and press it down upon the resilient supports 32. The upward pressure of these supports keeps the parts snugly in position. At one side of the cover, preferably diametrically opposite the spout 33, the wall 37 is cut way to provide a pulp discharge spout 46. Pulp from which the juice has been extracted is thrown from the strainer into the channel formed by the flange 27 and the cover 37. The rotation of the flange, assisted by the small projections 28, moves the pulp around until it reaches the discharge spout where it is thrown out and down into a receptacle which may be placed under the spout. Since some clearance between the flange 27 and the wall 38 is necessary, it is preferred to provide an inwardly directed flange 47 on the upper rim of the bowl 30 just under flange 28. The flange 47 may have a ridge 48 on the inner edge to prevent pulp from working back into the bowl.

The feed chute 39 preferably comprises an outer cylinder 50 suitably secured in the opening 40 of the cover 37 in axial alignment with the reamer, although slight eccentric offset is permissible if desired. This cylinder serves as a guide for an inner cylinder 51 which is provided on its inner surface with teeth to assist in disintegrating fruits and vegetables moving down the chute. These teeth may be elongated vertical ridges with sharp edges or short teeth of pyramidal shape. In any case, the cylinder 51 is so dimensioned that there is only short clearance between the teeth on it and the teeth on the cylindrical portion 24 of the reamer in the position of Fig. 1.

The novel combination of a conoidal reamer and a surrounding chute which have cooperating disintegrating means on their opposed surfaces and which are rotatable with respect to each other is an important feature of the present invention. Any kind of fruit or vegetable which is brought into contact with the reamer can be quickly disintegrated to fine pulp from which the juice is quickly removed in the strainer upon discharge from the chute. The teeth on the cylinder prevent the material in the chute from merely rotating with the reamer, and in the case of leafy vegetables in particular the slope of the rows of teeth on the reamer tend to pull the leaves downwardly into the constricting annular passage where disintegration and discharge into the strainer are assured. The feed of material to the reamer can be assisted by means of a plunger 52 fitting within the cylinder 51 which has a concave lower end conforming generally to the shape of the upper end of the reamer and a handle or knob 53 at the upper end to facilitate its use. In Fig. 1 the reamer is practically spherical at its upper end and the concave end of the plunger is also spherical with a slightly greater radius to provide a slight clearance and prevention of contact is assured by a stop flange 54 which engages the end of chute 50. In the case of citrus fruits where the rind is not to be disintegrated, the present invention permits juicing by impaling half a fruit on projections 55 in the concave end and then pressing the plunger downwardly. The projections 55 may be sloped so that contact of the fruit with the reamer tends to hold the rind more firmly. If desired, the stop 54 can be made adjustable to provide any desired clearance between the reamer and the concave end of the plunger. For seedless citrus fruits the present device works just as well in the position shown in Fig. 1 as for other kinds of fruits and vegetables, but for those which have seeds which it is desired not to disintegrate a slight adjustment is necessary to provide a discharge throat large enough to pass them whole. This adjustment is provided for by the slots 56 in the outer chute 50 in which pins 57 on the inner chute 51 are slidable. Short downwardly sloping cross slots 58 at each end of the vertical slots 56 extending in the direction of rotation of the reamer serve to hold the pins in either position of adjustment. In the upper position the lower end of chute 51 is spaced from the conical portion of the reamer far enough to clear citrus fruit seeds.

The embodiment of the invention shown in Fig. 7 comprises a motor shaft 11a which is threaded at the upper end, a mounting plate 12a on which a strainer 17a having apertures 26a is secured, e. g., by rivets, and a reamer 16a screwed onto the shaft 11a. The reamer 16a is provided with projections or teeth to disintegrate material fed to it by chutes 50 and 51 as already described for the other embodiment.

In this case the reamer has only conical and hemispherical surfaces and the lower end of chute 51 is preferably tapered to provide a discharge passage of substantial distance having parallel walls spaced only a short distance apart. Teeth may be provided on both of these opposed parallel surfaces, if desired. Fig. 8 shows a satisfactory shape for the teeth on the inner surface of chute 51. The teeth on reamer 16a may be arranged in sloping rows like the teeth 22 in Fig. 4.

It will be apparent to those skilled in the art that many modifications of the illustrative embodiments of the invention could be made without altering the principle thereof as set forth above. Certain parts, e. g., the strainer, the bowl housing, the chute 50, etc., could be dispensed with if their functions were not desired or were performed by other means. The parts, sub-combinations and combinations which are claimed as new and as embodiments of the present invention are set forth in the appended claims. It is to be understood that all such modifications and variations of the illustrative embodiments of the invention which have been used to explain its novel features and structure as fall within the scope of the claims are contemplated as part of the invention.

Having thus described and illustrated the invention, what is claimed as new, useful and inventive is:

1. A juice extractor comprising a conoidal reamer mounted for rotation about a vertical axis, a non-rotatable cylindrical chute mounted in axial alignment with said reamer and axially movable relative thereto, said chute in uppermost position leaving a passage between it and said reamer large enough for seeds of citrus fruits and in lowermost position closely surrounding the base of said reamer, teeth on said reamer, means on the opposed inner surface of said chute cooperating with said teeth to produce a disintegrating action on vegetable material fed downwardly in said chute in its lowermost position, and a plunger adapted to slide in said chute having a concavity in the lower end provided with projections adapted to hold half of a citrus fruit.

2. A juice extractor as set forth in claim 1 in which the surfaces of the reamer and chute adjacent to their lower ends are substantially parallel and form a narrow outlet passage of annular cross section for disintegrated material.

3. A juice extractor as set forth in claim 2 in which said parallel surfaces diverge outwardly at an angle of a few degrees relative to their common axis in the direction of movement of said material.

4. A juice extractor as set forth in claim 2 in which said parallel surfaces are substantially cylindrical and teeth are provided on both of said parallel surfaces.

5. A juice extractor comprising a bowl having a juice outlet, a conoidal reamer having a hemispherical dome rotatably mounted in said bowl, means for rotating the reamer, and a chute extending from the base of said reamer a substantial distance beyond the dome for feeding material to said reamer, said reamer and chute each having cooperating disintegrating means along a surface extending in axial direction, the distance between said surfaces diminishing in the direction of movement of said material to a narrow discharge passage of annular cross section.

6. A juice extractor as set forth in claim 5 in which the disintegrating means on said reamer comprise rows of teeth diverging rearwardly from the tip to the base with respect to a plane through the axis of rotation, whereby material is fed thereby toward said discharge passage.

7. An extractor adapted for juicing vegetables and citrus fruits comprising a non-rotatable cylindrical chute having internal teeth, a rotatable conoidal reamer having a hemispherical dome, the hemispherical and conical surfaces of said reamer having external teeth, means mounting said chute and reamer for relative axial movement to two different positions in one of which an end of the chute and the base of the reamer are adjacent to each other forming a narrow outlet passage between them adapted for disintegrating leafy vegetables and in the other of which the said end of the chute is away from said base far enough to permit passage of citrus fruit seeds, and a juice receiving bowl surrounding said reamer.

8. An extractor adapted for juicing vegetables and citrus fruits comprising a juice receiving bowl, a conoidal reamer having a hemispherical dome mounted for rotation about a vertical axis in said bowl, external teeth on the conical and hemispherical surfaces of said reamer a non-rotatable cylindrical chute having internal teeth mounted for vertical movement relative to said reamer to two different positions in one of which the lower end is adjacent to the base of the reamer forming a narrow outlet passage between them adapted to disintegrate vegetables and in the other of which said end is well above said base to permit passage of citrus fruit seeds, and a plunger slidable in said chute from the top, said plunger having a concave lower end provided with projections adapted to hold half a citrus fruit therein.

9. An extractor as set forth in claim 8 in which stop means are provided to limit inward movement of said plunger.

10. An extractor as set forth in claim 8 in which a centrifugal strainer is mounted for rotation with said reamer within said bowl.

11. A juice extractor adapted for juicing citrus fruits and other fruits and vegetables comprising a frame, a juice-receiving bowl mounted in said frame, a juice spout for said bowl, a motor mounted in said frame below said bowl, a mounting plate in said bowl operatively connected to the shaft of said motor for rotation thereby, a conoidal reamer having a hemispherical dome and surrounding centrifugal strainer secured to said mounting plate, said strainer diverging upwardly and terminating above said bowl, a cover for said bowl, a pulp discharge spout on said cover, a cylindrical chute slidably mounted on said cover, and means for selectively positioning the lower end of said chute either adjacent to the base of said reamer or spaced well above the same, said reamer and chute having teeth on their opposed surfaces which are adapted to disintegrate non-citrus fruits and vegetable when the chute is in the first mentioned position but which clear seeds of citrus fruits when in the second mentioned position.

12. A juice extractor as set forth in claim 11 in which said reamer has a cylindrical portion adjacent to its base which is surrounded by said chute when in the first mentioned position to form a narrow annular disintegrating discharge passage.

13. A juice extractor as set forth in claim 11 in which said reamer has a plurality of rows of teeth sloping rearwardly from top to bottom.

14. A juice extractor as set forth in claim 13 in which the reamer is hollow, has a slot in front of each row of teeth through which particles formed by said teeth may pass into the hollow interior, and outlet passages at the base of said reamer through which such particles may pass by centrifugal force from the hollow interior into said strainer.

15. A reamer for a juice extractor comprising a mounting plate, a hollow conoid secured at its rim to said plate, said conoid having a plurality of elongated slots and rows of teeth projecting outwardly from the trailing rim of each slot.

16. A juice extractor comprising a bowl housing having a cylindrical wall, a bowl adapted to fit within said housing, a juice spout on said bowl, means within said bowl for extracting juice, an annular cover having a cylindrical wall of the same diameter as the cylindrical wall of said bowl housing, and means removably securing the cover to the bowl housing.

17. A juice extractor as set forth in claim 16 in which there are stops on the interior of the cylindrical wall of said cover, resilient means pressing the rim of the bowl against said stops, an inwardly directed flange on the rim of the bowl, a strainer rotatable within said bowl having a flange overlying the flange on said bowl, said cover and bowl flange forming a pulp receiver from said strainer, and a pulp spout on said cover.

18. A juice extractor adapted for removing juice from leafy vegetables and citrus fruits comprising a conoidal reamer having a hemispherical dome, teeth on the hemispherical and conical surfaces of said reamer, a motor for rotating said reamer about its axis at high speeds, a chute surrounding said reamer at one end and extending at the other end a substantial distance beyond the dome of the reamer to provide a feed chamber for leafy vegetables, said chute and reamer having closely spaced substantially parallel surfaces adjacent to the said one end of the chute, said parallel surfaces having cooperating disintegrating means, and a bowl for receiving juice from said chute.

19. A juice extractor as set forth in claim 18 in which said reamer rotates on a vertical axis and the chute is cylindrical.

WILLIAM A. DOERING.

REFERENCES CITED

The following references are of record in the file of this patent:

UNITED STATES PATENTS

| Number | Name | Date |
| --- | --- | --- |
| 1,266,075 | Spitz | May 14, 1918 |
| 1,533,208 | Pursell | Apr. 14, 1924 |
| 1,886,092 | Graham | Nov. 1, 1932 |
| 2,026,918 | Streckfuss | Jan. 7, 1936 |
| 2,206,204 | Richli | July 2, 1940 |
| 2,215,994 | Bean | Sept. 24, 1940 |
| 2,289,656 | Knapp | July 14, 1942 |
| 2,440,425 | Williams | Apr. 27, 1948 |
| 2,481,010 | Gundelfinger | Sept. 6, 1949 |

FOREIGN PATENTS

| Number | Country | Date |
| --- | --- | --- |
| 315,603 | Italy | Mar. 2, 1934 |
| 333,234 | Italy | Dec. 23, 1935 |
| 795,562 | France | Mar. 17, 1936 |